Patented Aug. 18, 1942

2,293,265

UNITED STATES PATENT OFFICE 2,293,265

SURFACE ACTIVE AGENT

Louis A. Mikeska, Westfield, N. J., assignor to Standard Oil Development Company, a corporation of Delaware No Drawing. Application December 20, 1939, Serial No. 310,171

5 Claims. (Cl. 260—457)

This invention relates to the preparation of improved surface active agents which, when dissolved in aqueous solutions, effect an improvement in the detergent, penetrating, emulsifying, and wetting-out properties of the solutions. The invention also relates to the similar uses of these compounds in which the reduction of surface tension of aqueous solutions or interfacial tension of water-oil dispersions is desired.

It is generally considered that, to effect a reduction of surface tension of an aqueous solution or interfacial tension of a water-oil dispersion, the addition agents employed should be capable of becoming concentrated in the surface layer or the interfacial layer, respectively, and becoming oriented therein. To be active in this manner, the molecule is usually possessed of a hydrophilic group, such as a hydroxyl, sulfate, or sulfonate radical, and a hydrophobic portion. These groups have a balanced relation in the better type products so that the latter may not be unsatisfactory by being either too water-soluble or too oil-soluble. The compounds of the present invention are esters or imides of unpolymerized polyhydric alcohols, which contain, as a hydrophilic group, either a sulfate or a sulfonate radical, and, as the hydrophobic portion, a naphthenic group; the hydrophilic and hydrophobic groups are so balanced in their respective activities as to render the compounds containing them suitably soluble in both aqueous and oil solutions.

Many of the detergents prepared previously have inherent disadvantages, such as their reactions with salts and other impurities in hard water or with salts and various hydrolytic products in acid-containing baths to form water-insoluble compounds. Since there is a tendency for the detergents to be salted out in the caustic soda baths of mercerizing processes, the use of such materials in this connection may be not only unsatisfactory but actually harmful. In the case of detergents containing a free carboxyl group, one means of overcoming these difficulties involves the reaction of the detergents with amino compounds, but the method is not always practicable or satisfactory. In the present invention, the particular compounds employed have highly satisfactory wetting-out and detergent characteristics, and no cloudiness or precipitation occurs when they are added to hard water. These compounds are also readily prepared and chemically stable.

The compounds of the present invention may be prepared by treating the naphthenic acid esters or imides of aliphatic monomeric polyhydric alcohols, that is, the unpolymerized polyhydric alcohols, with 95 to 100% sulfuric acid or other strong sulfuric acid reagents such as chlorosulfonic acid and many organic sulfonic acids. The preparation of these compounds may be carried out by treating an unpolymerized polyhydric alcohol naphthenic ester or imide, containing a free hydroxyl group with concentrated sulfuric acid. In such reactions, the sulfuric or sulfonic acid may react with the free alcoholic groups, the naphthenic acid radicals, or both. Upon neutralization of the reaction product with a base metallic sulfates or sulfonates are produced. A modification of this preparative method consists of treating a polyhydric alcohol ester or imide containing no free hydroxyl groups with concentrated sulfuric acid. Such a process presumably involves partial hydrolysis of the ester or imide compound and the subsequent production of sulfates, but sulfonates are probably also formed by the reaction of the sulfuric acid with the naphthenic acid radicals. Still another modification of the process consists of a one-stage operation wherein the polyhydric alcohol and naphthenic acids or acid amides are mixed together and a concentrated sulfating or sulfonating agent is then gradually added, the sulfate or sulfonate of the naphthenic acid ester or imide thereby being produced. This preparation may also be accomplished by adding the polyhydric alcohol slowly to a mixture of naphthenic acids or acid amides and the concentrated sulfuric acid reagent. Neutralization of the acidic compounds so formed, either by the alkali metal bases or by basic compounds of the type of the amines, produces compounds that are good wetting-out agents and also good detergent and emulsifying agents. The actual properties of the soaps obtained depend upon the nature and molecular weight of the naphthenic acids or acid amides used.

The polyhydric alcohols which may be employed in preparing the compounds of this invention are any of the more common polyhydric aliphatic compounds. The preferable compounds are, however, the dihydric and trihydric alcohols, and especially glycol and glycerol. The higher monomeric polyhydric alcohols, such as erythritol, can also be employed to advantage. The corresponding alkylene oxides may be used instead of the hydroxy compounds.

The preferred naphthenic acids employed are those which have been extracted from naphthenic type crudes, especially those of Columbian and Gulf Coast origin. The acids are usually extracted as a water insoluble layer when the alkali solutions used in neutralizing acid treated distillates above the naphtha range derived from naphthenic type crudes are acidified preferably by means of a mineral acid. The crude naphthenic acids are washed with water and then vacuum distilled. Other sources and the properties of naphthenic acids are given by C. Ellis in his book, "The Chemistry of Petroleum Derivatives" vol. 1, published by The Chemical Catalog Co. Inc., 1934. Suitable naphthenic acids are those boiling within the range of the lubricating oil distillates and of neutralization values between 100 and 300. Instead of the acids, other oxy-naphthenic compounds such as the acid amides, alcohols and ethers may be employed. Thus, a wetting-out agent has been prepared by reducing naphthenic acids to the corresponding alcohols and then condensing the product with an alkylene oxide, thereby preparing a glycol ether, and then treating this material with the strong sulfuric acid reagent.

The term "strong sulfuric acid reagent" is employed in this description to include sulfuric acid of 95% to 100% concentration, fuming sulfuric acid, chlorosulfonic acid and organic sulfonic acids having reactivities similar in effect and degree under similar conditions to sulfuric acid. The suitable organic sulfonic acids include the hydroxy sulfonic acid derivatives of organic compounds having less than about ten carbon atoms in the molecule, such as 2-hydroxy ethane sulfonic acid and similar hydroxy alkyl sulfonic acids.

The reactions between the various reactants are brought about at temperatures of between −10° F. and 250° F. The reaction time for the preparation of the compounds of the invention varies between 3 and 7 hours.

Examples of specific substances which have been found to be particularly satisfactory as surface active agents are:

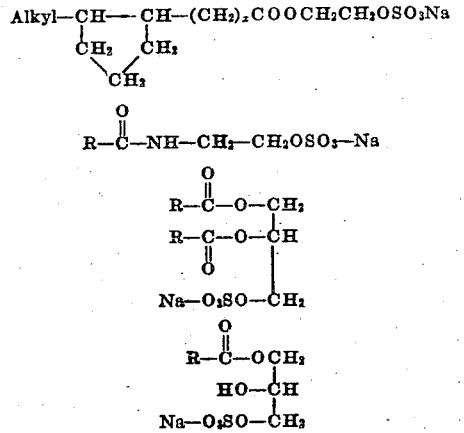

where R is a naphthenyl or sulfonated naphthenyl group.

Example 1

Sulfated ethylene glycol mononaphthenate was prepared in the following manner: 600 grams of vacuum-distilled naphthenic acids obtained from lubricating oil distillates derived from naphthenic crudes, were esterified with an equi-molar quantity of ethylene glycol in the presence of benzene and 20 cc. of concentrated sulfuric acid. The water of reaction was removed as formed by continuously distilling off the benzene-water azeotrope, the separated benzene being recycled to the reactor, if desired. The esterified material was washed, dried, and distilled under 5 mm. pressure. 551 grams of an ester product, boiling between 225° C. and 310° C., and having an acid number of 2 and a saponification number of 221, were obtained. This material consisted primarily of ethylene glycol mono-naphthenate, together with some ethylene glycol dinaphthenate. 50 grams of this material were placed in a three-necked flask provided with a stirrer, thermometer, and dropping funnel, 50 cc. of naphtha were added, and the mixture was cooled to 10° C. by means of an ice bath. 28 grams of 60% fuming sulfuric acid were added slowly at 10° C. through the dropping funnel to the contents of the flask which were agitated by means of the stirrer, the temperature during the addition not being permitted to rise above 10° C. When the sulfuric acid had all been added, the ice bath was removed and the mixture was agitated for an additional 2½ hours at a temperature of between 25° and 30° C. The solution was then neutralized by means of aqueous alkali, care being taken not to let the temperature rise above 30° C. during neutralization. The neutralized solution was evaporated to dryness. The residue was extracted with a mixture of naphtha and 98% isopropyl alcohol in order to dissolve the organic compounds. Enough water was then added to the extract to reduce the alcohol concentration to 50%, and the resulting naphtha layer was removed by the use of a separatory funnel. The alcohol-water layer was then extracted several times with naphtha to remove unreacted ester compounds. The remaining solution was evaporated to dryness. The residue consisted of sulfated ethylene glycol mononaphthenate. This material had good foaming and wetting-out characteristics.

The potency of compounds as surface active agents can be evaluated by one of several methods. The tests are concerned with the determination, under standard conditions, of the time required for an aqueous solution of known concentration of the compound to wet and penetrate a skein of cloth fibres or a cloth fabric of standard character, weight, form and size. The methods are particularly suited to the evaluation of wetting-out and penetrating properties. One of such tests commonly employed is that developed by Draves and Clarkson and described in Proceedings of the American Association of Textile Chemists and Colorists, p. 109 (1931). This test was employed to determine the relative wetting-out capacity of the compound prepared in Example 1.

Example 2

The following tabulation presents data which demonstrate the highly satisfactory wetting-out characteristics of the product prepared in Example 1. Data for oleyl sulphate, which is a well-known wetting-out agent, are included for purposes of comparison.

| Soap product | Conc. | Wetting No. (Draves-Clarkson method) | | |
| --- | --- | --- | --- | --- |
| | | Neutral | +Ca 300 ppm. | in 0.3% $H_2SO_4$ |
| | Per cent | Seconds | Seconds | Seconds |
| Oleyl sulfate | 0.2 | 136 | 131 | 106 |
| Sulfated ethylene glycol mononaphthenate | 0.2 | 21 | 16 | 35 |

The satisfactory wetting-out characteristics of sulfated ethylene glycol mononaphthenate are apparent from the above comparison of data. An important feature of the compounds of this invention which is not brought out by the tabulation is that they do not cause cloudiness or precipitate in the concentrations employed. In this respect, the products of the invention are superior to many widely used wetting-out agents, which form cloudy solutions in hard waters and, in some cases, actually precipitate from solution.

Further illustrations of the preparation and testing of compounds within the scope of the invention are presented in Examples 3, 4 and 5.

Example 3

A glycerol ester of naphthenic acids was made by heating a mixture containing approximately 1 mole of glycerol and 3 moles of naphthenic acids (obtained from Colombian gas oil) at 400° to 450° F. for 6 to 7 hours, in the presence of a small quantity of sulfuric acid as a catalyst, and then stripping off low boiling compounds under vacuum (4 mm. Hg) up to a still temperature of 450° F. The remaing ester, which represented 83.7% of the total charge (acids and glycerol), had a neutralization value of 10.71 and a saponification value of 200.5 mg. KOH/gm.

153 grams of this ester were diluted with 150 cc. of petroleum ether, and the solution was treated with 53.7 grams of 95% sulfuric acid by adding the acid slowly to the ester solution with thorough agitation over a period of 1.5 hours, the reaction temperature being maintained at 95 to 105° F. The mixture was then neutralized with 15% aqueous caustic soda solution, and, on addition of 150 cc. of 91% isopropyl alcohol, three layers were formed: (1) a bottom layer of saturated salt solution, (2) a middle layer of alcoholic "soap" solution, and (3) a top naphtha layer containing unreacted ester and other oil-soluble compounds. The layers were separated. The middle layer of alcoholic soap solution was diluted with 50 cc. of water, and extracted with 150 cc. of petroleum ether to remove any oil-soluble compounds. The soap solution was then diluted with 91% isopropyl alcohol to a volume of 1000 cc. to precipitate dissolved inorganic salts. The solvent was then distilled from the soap solution and the soap was dried by heating at 160° C. for a short time. The yield of the soap surface active compound was 98 grams, or 64% based on the glycerol ester. The compound was a transparent, light-brown colored solid.

Example 4

One gram mole of glycerol was treated with 1.87 gram moles of a naphthenic acid mixture having a neutralization value of 246. To this mixture was added 92% by weight of fuming sulfuric acid (20% excess $SO_3$) over a period of 3 hours, the reaction temperature varying between 95° and 195° F. The mixture was then neutralized and extracted with alcohol. From the alcoholic solution, a residue was obtained which represented a 97.2% yield of soap, based upon the amount of glycerol and naphthenic acids used.

Example 5

The wetting-out characteristics of the compounds prepared in Examples 3 and 4 determined by measuring the time required for standard cloth discs to sink in solutions of the wetting-out agent in neutral or distilled water, in hard water containing 300 parts calcium per million, and in 0.3% aqueous solution of sulfuric acid. The concentrations of the wetting-out agents in the test solutions and the results of the wetting number determinations are tabulated below:

| Wetting agent | Conc. | Wetting number, seconds in— | | |
|---|---|---|---|---|
| | | Neutral solution | Hard water Ca=300 ppm. | Acid solution 0.3% $H_2SO_4$ |
| Soap obtained in Example 3 | Per cent 0.2 | 46 | 65 | 65 |
| Soap obtained in Example 4 | 0.2 | 26 | 91 | 136 |

In addition to the saturated polyhydric alcohols, the corresponding unsaturated compounds containing one or more double bonds may be employed. These compounds may be obtained from the polyhydric alcohols by splitting off water or by dehydrohalogenating the halogenated saturated alcohols. Derivatives of these compounds may also be used. All of these compounds are to be regarded as equivalents for the purpose of the present invention.

This invention is not to be limited by any specific examples or theoretical explanations presented herein, all such being given solely for purposes of illustration. The invention is limited only by the following claims.

I claim:

1. The process of preparing a sulfuric acid derivative of an aliphatic monomeric dihydric alcohol naphthenate suitable for use as a wetting-out, emulsifying, dispersing, and penetrating agent, which comprises reacting a naphthenic acid with a glycol and treating the product with sulfuric acid.

2. The process of preparing a sulfuric acid derivative of an aliphatic monomeric dihydric alcohol naphthenate suitable for use as a wetting-out, emulsifying, dispersing and penetrating agent, which comprises reacting a nephthenic acid derived from petroleum naphthenic crudes and of lubricating oil boiling range with a glycol and treating the product with a strong sulfuric acid reagent.

3. The process of preparing sulfated ethylene glycol mononaphthenate which comprises reacting a naphthenic acid with ethylene glycol and treating the product with sulfuric acid.

4. Sulfated ethylene glycol mononaphthenate.

5. As an improved surface active agent a sulfated, aliphatic, monomeric, dihydric alcohol mononaphthenate.

LOUIS A. MIKESKA.